United States Patent
Gennermann

(10) Patent No.: US 9,376,090 B2
(45) Date of Patent: Jun. 28, 2016

(54) METHOD FOR AUTHENTICATING A DRIVER IN A MOTOR VEHICLE

(71) Applicant: Huf Hülsbeck & Fürst GmbH & Co. KG, Velbert (DE)

(72) Inventor: Sven Gennermann, Velbert (DE)

(73) Assignee: Huf Hülsbeck & Fürst GmbH & Co. KG, Velbert (DE)

(*) Notice: Subject to any disclaimer, the term of this patent is extended or adjusted under 35 U.S.C. 154(b) by 0 days.

(21) Appl. No.: 14/415,592

(22) PCT Filed: Jun. 27, 2013

(86) PCT No.: PCT/EP2013/063542
§ 371 (c)(1),
(2) Date: Jan. 18, 2015

(87) PCT Pub. No.: WO2014/012762
PCT Pub. Date: Jan. 23, 2014

(65) Prior Publication Data
US 2015/0191152 A1 Jul. 9, 2015

(30) Foreign Application Priority Data
Jul. 18, 2012 (DE) .......................... 10 2012 106 522

(51) Int. Cl.
*B60R 25/02* (2013.01)
*B60R 25/04* (2013.01)
(Continued)

(52) U.S. Cl.
CPC .............. *B60R 25/30* (2013.01); *B60R 25/02* (2013.01); *B60R 25/04* (2013.01); *B60R 25/20* (2013.01); *G07C 9/00158* (2013.01)

(58) Field of Classification Search
CPC ........ B60R 25/02; B60R 25/04; B60R 25/10; B60R 25/20; B60R 25/25; B60R 25/252; B60R 25/255; B60R 25/257; B60R 25/30; B60R 25/302; B60R 25/305; G07C 9/00158
See application file for complete search history.

(56) References Cited

U.S. PATENT DOCUMENTS

| 5,519,260 A | * | 5/1996 | Washington | 307/10.5 |
| 5,656,867 A | * | 8/1997 | Kokubu | 307/10.5 |

(Continued)

FOREIGN PATENT DOCUMENTS

| CN | 1722621 | 1/2006 |
| CN | 102404467 | 4/2012 |

(Continued)

OTHER PUBLICATIONS

International Search Report and the Written Opinion Dated Aug. 29, 2013 From the International Searching Authority Re. Application No. PCT/EP2013/063542 and Its Translation Into English.

(Continued)

*Primary Examiner* — Laura Freedman

(57) ABSTRACT

The invention relates to a method for authenticating a driver (2) in a motor vehicle (1) by means of a recognition device (10) disposed in the motor vehicle (1) for collecting actual data (50) of the driver (2) which are transmitted during the authentication to a checking device (20) disposed in an external station (3) outside the motor vehicle (1), wherein the checking device (20) compares the actual data (50) with the target data (60) and in the event of conformity of the actual data (50) with the target data (60) an enabling signal (70) is sent from the external station (3) to the motor vehicle (1), thus enabling the driver (2) to start the motor vehicle (1).

20 Claims, 2 Drawing Sheets

(51) Int. Cl.
  *B60R 25/20* (2013.01)
  *B60R 25/30* (2013.01)
  *G07C 9/00* (2006.01)

(56) References Cited

U.S. PATENT DOCUMENTS

| | | | |
|---|---|---|---|
| 5,686,765 A * | 11/1997 | Washington | 307/10.5 |
| 6,219,793 B1 * | 4/2001 | Li | B60R 25/2018 726/19 |
| 6,252,978 B1 * | 6/2001 | Grantz | 382/118 |
| 6,259,168 B1 * | 7/2001 | Okada | 307/10.5 |
| 6,268,790 B1 * | 7/2001 | Cregeur | 340/425.5 |
| 6,400,835 B1 | 6/2002 | Lemelson et al. | |
| 6,532,298 B1 * | 3/2003 | Cambier | A01K 11/006 340/5.82 |
| 6,548,915 B1 * | 4/2003 | Geber et al. | 307/10.2 |
| 6,727,800 B1 * | 4/2004 | Dutu | B60R 25/02102 123/179.1 |
| 7,161,464 B2 * | 1/2007 | Yuhara | 340/5.2 |
| 7,171,293 B2 * | 1/2007 | Ichikawa et al. | 701/36 |
| 7,173,517 B2 * | 2/2007 | Kondo et al. | 340/5.72 |
| 7,228,122 B2 * | 6/2007 | Oyagi | B60R 25/04 455/411 |
| 7,315,233 B2 * | 1/2008 | Yuhara | 340/5.72 |
| 7,679,486 B2 * | 3/2010 | Okada | 340/5.72 |
| 7,801,507 B2 * | 9/2010 | Benco et al. | 455/410 |
| 7,868,736 B2 * | 1/2011 | Fukushima | B60R 25/04 180/287 |
| 7,946,483 B2 * | 5/2011 | Miller | G07C 9/00158 235/382 |
| 8,222,989 B2 * | 7/2012 | Ziska et al. | 340/5.1 |
| 8,880,291 B2 * | 11/2014 | Hampiholi | 701/36 |
| 2002/0135466 A1 | 9/2002 | Bunyan | |
| 2005/0193212 A1 * | 9/2005 | Yuhara | B60R 25/25 713/186 |
| 2005/0206502 A1 | 9/2005 | Bernitz | |
| 2006/0215884 A1 * | 9/2006 | Ota | 382/118 |
| 2008/0066186 A1 * | 3/2008 | Hammes | 726/27 |
| 2010/0265204 A1 * | 10/2010 | Tsuda | G06F 1/1626 345/174 |
| 2011/0133886 A1 * | 6/2011 | Monig et al. | 340/5.61 |
| 2011/0148574 A1 * | 6/2011 | Simon et al. | 340/5.61 |
| 2012/0313796 A1 | 12/2012 | Lee et al. | |
| 2013/0099940 A1 | 4/2013 | Protopapas | |
| 2015/0098630 A1 * | 4/2015 | Perna | G06K 9/00604 382/117 |

FOREIGN PATENT DOCUMENTS

| | | |
|---|---|---|
| DE | 10339476 | 5/2005 |
| DE | 102004057746 | 6/2005 |
| DE | 102006042358 | 3/2008 |
| DE | 602006000078 | 5/2008 |
| EP | 1634782 | 3/2006 |
| GB | 2373614 | 9/2002 |
| GB | 2421623 A * | 6/2006 |
| GB | 2478922 A * | 9/2011 |
| WO | WO 2005/021340 | 3/2005 |
| WO | WO 2014/012762 | 1/2014 |

OTHER PUBLICATIONS

Internationaler Recherchenbericht and Schriftlicher Bescheid [International Search Report and the Written Opinion] Dated Apr. 13, 2015 From the International Searching Authority Re. Application No. PCT/EP2014/078277.

Notification of Office Action and Search Report Dated Dec. 28, 2015 From the State Intellectual Property Office of the People's Republic of China Re. Application No. 201380037787.2 and Its Translation of Office Action in English.

* cited by examiner

METHOD FOR AUTHENTICATING A DRIVER IN A MOTOR VEHICLE

RELATED APPLICATIONS

This application is a National Phase of PCT Patent Application No. PCT/EP2013/063542 having International filing date of Jun. 27, 2013, which claims the benefit of priority of German Patent Application No. 10 2012 106 522.5 filed on Jul. 18, 2012. The contents of the above applications are all incorporated by reference as if fully set forth herein in their entirety.

FIELD AND BACKGROUND OF THE INVENTION

The invention relates to a method for authenticating a driver in a motor vehicle. Further the invention relates to a system, which is operatable with the previously mentioned method.

From the state-of-the-art it is known to improve protection mechanisms against car theft or develop devices, which only allow that the authorized person can drive the motor vehicle, particularly start the vehicle. Many versions of safety devices exist, which only allow the driver the ignition of the motor vehicle only after identification with biological information of the driver. The DE 60 2006 000 078 T2 uses biometric authentication, wherein the verification of the registered biometric data of the driver occurs via a motor vehicle steering mechanism. The main disadvantage of the state-of-the-art is that each motor vehicle has to be equipped with such a verification unit. Moreover, the risk occurs that during the verification of the biometrical data many manipulations can occur at the motor vehicle.

The objection of the present invention is to avoid the previously mentioned disadvantages particularly an efficient method for authentication of a driver in a motor vehicle wherein at the same time reliable operation mode is granted.

SUMMARY OF THE INVENTION

The mentioned objection is solved by a method with all the features of claim 1. Advantageous embodiments of the invention are mentioned in the dependent claims. Moreover, the invention is solved by a system with all features of claim 11. Advantageous embodiments are mentioned in the dependent claims 13 to 20.

A method according to the invention for authenticating a driver in a motor vehicle is intended, with a recognition device assembled in the motor vehicle for recognizing the actual data of the driver which are sent to a verification device during the authentication, which is assembled in an external station outside the motor vehicle, wherein the recognition device compares the actual data with a target data and by a matching of the actual data with the target data an enabling signal is sent from the external station to the motor vehicle, whereby an ignition procedure of the motor vehicle is enabled for the driver.

A main element of the invention is that actual data of the driver are recognized within the motor vehicle via a recognition device. This means that the determination of the actual data of the driver only occur, when the driver is within the motor vehicle, particularly sits on the driver seat of the motor vehicle. After recognition of this actual data another step of the method according to the invention occurs, namely that this recognized actual data are transferred to an external station, wherein this external station is outside the motor vehicle. The external station of the motor vehicle is spaced apart from the motor vehicle comprises a recognition device, which compares the actual data with previously saved target data. If the actual data match the target data an enabling signal is sent from the external station to the motor vehicle, which received the enabling signal, whereby an ignition operation of the motor vehicle is enabled. Without enabling signal the driver cannot start the ignition operation within the motor vehicle, because this is blocked or deactivated. Only by a positive authentication, meaning with a matching of the actual data with the target data, the ignition operation is released. It is an advantage, if the actual data are biometrical data of the driver.

Advantageously, the target data can be memorized in the extended station before the authentication, particularly a memorizing device is intended which recognizes target data of the driver outside the motor vehicle, which are for example saved in the external station. The memorizing device can for example be a camera, which recognizes visual data of an authenticated person who wants to start the motor vehicle. The memorizing device can in another embodiment be developed in a way that visually and/or optically defined biometric characteristics of the driver are recognized and saved target data.

It is also possible that the memorizing device is intended outside the vehicle, which recognizes the target data of the driver. This device is in communication with the external station, wherein the external station comprises the checking device which is responsible for comparing the memorized target data with the actual data.

The invention further comprises the possibility that beneath the biometrical target data in the external station further information is storable, which restrict or limit a possible ignition operation of the motor vehicle. This means that a person a defined timeframe, for example a defined day, month or hour, etc. is provided in order to initiate a positive ignition operation of the motor vehicle.

It is further possible that no matching occurs as long as the motor vehicle is in the safety mode, in which the ignition of the motor vehicle is blocked, wherein by a matching of the data the motor vehicle is in the ignition mode. For example the ignition steering of the motor vehicle can be deactivated in the safety mode, in order not to allow the non-authorized person the ignition of the vehicle. Only with the matching of the data a change of mode of the motor vehicle occurs, namely from the safety mode to the ignition mode. Via a corresponding action of the driver, for example by insertion and or turning of the ignition key of the vehicle lock intended within the motor vehicle, an ignition of the motor of the motor vehicle occurs. Likewise it is possible that a start-/stop-switch is intended for activation of the ignition of the motor of the motor vehicle.

In another action improving the invention it can be intended that in the external station it is readable, particularly in the checking device, in how far the motor vehicle resides in a safety mode or in an ignition mode.

Likewise the method according to the invention can be integrated in a start-/stop-system of a motor vehicle, which is an automatic working system for reducing the fuel consumption in standing phases, for example during a traffic light stop. The start-/stop-system works within an automatic engine cut-off. The method according to the invention can for example be integrated in a start-/stop-system in a way that in case of an automatic motor cutoff and a subsequent automatic motor start an authentication of the driver according to the invention fails to appear if previously a positive authentication has occurred.

According to the invention the method can comprise a steering, which starts the authentication based on at least one defined action of the driver. This means that the driver has to consciously or unconsciously perform an action, so that the authentication is started. This defined action can for example be an activation of the coupling, the direction indicator, a contact of the steering wheel, particularly at a defined position, taking of the seat position in the driver seat, a conscious activation of a switch, of a position, of a knob, an activation of the horn etc. Advantageously the authentication starts with a conscious activation of the ignition switch or a start-/stop-switch assembled within the motor vehicle.

Further it can be an advantage that the recognition device registers biological information of the driver as actual data during the authentication, wherein the actual data at least comprises one of the following biological information: body height, iris, retina, face geometry, fingerprint, hand line structure, hand blood vessel structure, hand geometry, nail bed pattern, ear form, voice, signature, motion pattern behavior for at least one defined movement of the driver, lip movement, body odor, DNA examination. Using the biometrical examination a high security and a high reliability can be achieved during the authentication of the driver. A combination of at least two biometric characteristics is also possible for a reliable authenticating process, for example the combination of the face recognition with a fingerprint. The face recognition can for example occur via a camera. The fingerprint recognition can for example be performed via semi conductor fingerprint sensors. For example striped sensors are possible by which the respective finger is to be moved.

The method according to the invention also includes that a recognition device stays deactivated as long as the external station sends a corresponding reveille to the motor vehicle. This means that it can be determined from the external station which motor vehicle can actually be started at which point of time.

Advantageously, an authentication can only start when a second defined action of the driver exists, particularly if the vehicle-facing sensor recognizes the second defined action. The second action can for example be an activation of the coupling, of the turning light, a touching of the steering wheel, particularly at a defined position, the taking of the seat position in the drivers seat, a conscious activation of a switch, an area, a knob, the activation of the horn etc. Via that usage of the second defined action of the driver an increased security and reliability of the method can be accomplished. It is for example possible that the sensor is performed as a seat sensor or a door sensor or a pedal sensor or a gear shift sensor or a sensor for recognition of a mobile identification device, which is carried on by the user. Likewise it can be intended that the sensor is a safety belt sensor. This means that only when the driver is sitting on the driver seat or the driver door is locked or a corresponding pedal is actuated or the gear shift lever had a defined position or is brought into a defined position or the safety belt is buckled according to the instructions, the authentication process can be started by a first defined action of the driver particularly via the activation of the ignition switch and or the start-/stop-switch can be started. Likewise it can be intended that initially identification verification between the mobile identification device which is carried on by the motor vehicle owner or driver and the motor vehicle occurs wherein with a positive identification verification the previously first explained defined action the driver releasing the authentication.

Advantageously, the recognition device can comprise a camera for recognizing the actual data. For example the camera can be a CCD-camera, which can also record and determine body movements or composure of the driver.

Further, the objection is solved by a system for authentication of the driver in the motor vehicle with a recognition device assembled within the motor vehicle for recognizing actual data of the driver, which are transmitted to the recognition device during the authentication, which is assembled in an external station outside the motor vehicle, wherein the recognition device compares the actual data with the target data and an enabling signal is sent from the external station to the motor vehicle in case of a matching of the actual data with the target data, whereby an ignition operation of the motor vehicle is enabled for the driver. The recognition device can be assembled and settled in an electronic box within the motor vehicle. Moreover, the motor vehicle can be upgraded concerning this box. Particularly, this system can be an advantage for rental car agencies, fleet vehicle of companies and even for insurances, for which the information is important who and how often the motor vehicle is operated. Particularly, concerning the insurance premium for a respective vehicle it can be intended according to the invention that the system individually informs the external station how often which driver has driven this respective vehicle.

Advantageous embodiments of the system are described in the dependent claims 13 to 20.

Advantageously, the motor vehicle can comprise communication means in order to send and or receive actual data and an enabling signal wherein the external station comprises a communication means in order to receive and/or send actual data and an enabling signal. The communication means of the motor vehicle and the communication means of the external station can be provided as the sending and/or receiving composition. The communication between the communication means can advantageously be encrypted. The communication means of the motor vehicle can be integrated in the recognition device.

It is an advantage if the actual data are biometrical data of the potential driver.

Further it is a possibility to integrate the steering of the recognition device wherein the steering can be brought into a signal connection with the motor steering. The steering decides among others when the authentication stats. Herewith it is possible that starting with at least one first defined action of the driver the authentication starts. Likewise it is possible that at least two defined actions of the driver are necessary in order to start the identification. This is recognized by the steering, which in another embodiment can also be assembled outside the recognition device, particularly integrated in the motor steering of the motor vehicle.

Further possibilities arise according to the invention that the external station is in connection with the databank and or the memory, in which the target data are stored or saved. Herewith it can be an advantage that the external station comprises a recognition device for recognizing the biometrical target data. Like with the recognition devices for recognizing the biometrical actual data the corresponding instrument, apparatus like for example a camera, etc. is possible, so that the recognition device of the external station can reliably recognize the biometrical target data. In another embodiment of the invention it is possible that initially the driver befalls in the external station in which his/her target data particularly biometrical target data are recognized via a recognition device. Then these target data are saved in the databank. The checking device of the external station accesses this databank during the authentication in order to compare or investigate actual data of the driver with the target data or verify these data for matching. Is the external station for example a rental car agency the driver can approach the motor vehicle after the target data are recognized in the extended station. If the driver has now unlocked the vehicle, opened the door and afterwards sits down on the driver seat the authentication can start according to the described method according to the invention. This means that the recognized actual data are initially recognized by the recognition device assembled within the motor vehicle, are afterwards sent to the external station which performs the corresponding examination in how far the actual data correspond to the target data. With a matching of the data the motor vehicle receives a corresponding enabling signal from the external station so that the driver can start the motor vehicle.

Advantageously, the external station is the Internet. Thereby it is possible that the checking device is peripherally assembled in order to secure all motor vehicles or in order to perform an authentication operation with all drives of the different motor vehicles. Herewith it can be an advantage that there are a majority of recognition devices which recognize the target data which in turn are transmitted by corresponding communication means for example via radio and/or via Internet to the extended station particularly to the checking device. The central checking device can perform a matching of the actual data received from the motor vehicle with the respective target data.

In order to accomplish an increased safety the recognition device can be assembled within the motor vehicle in a way that only recognition of entry data from the driver seat of the motor vehicle is possible. Thereby it is avoided that during the memorization of the actual data occurs from another position within the motor vehicle. A purpose of this embodiment is that it can be effectively avoided that a non-authorized driver can start the vehicle wherein at the same time the actual driver is within the motor vehicle and the correct actual data are memorized via the recognition device. It is for example possible that in the proximity of the vehicle steering wheel and/or the armature in the proximity of vehicle steering wheel or at a defined position of the driver seat the recognition device is assembled which is not accessible for the co-driver without further ado.

In a possible embodiment of the invention the recognition device can be permanently assembled within the motor vehicle wherein the recognition device can adopt a function of the communication device for example that it can be called with the recognition device at the same time. The recognition device can comprise a communication module with the cellular radio module for the assembly of a communication connection via the mobile network. Further this communication connection can also be used for the previously described authentication, which means that via the communication connection the authentication request between the external station and the motor vehicle can be performed.

It is likewise possible that the recognition device is mobile within the motor vehicle. Herewith it can be intended that the recognition device is a telephone device, particularly a cell phone, which can communicate with the own communication means with the checking device.

In another embodiment of the invention the actual data can be composed via a credit card, an EC-card, a passport, identification or via a driver's license of the driver. Particularly, it is possible that the recognition device memorizes defined areas of the identification and this actual data are subsequently transmitted to the checking device.

Further advantages, features and details of the invention reside from the subsequent description in which in reference to the drawings multiple possible embodiments of the invention are described in detail. Thereby the described features of the claims and the description can individually or in random combinations be substantial for the invention. It shows:

DESCRIPTION OF SPECIFIC EMBODIMENTS OF THE INVENTION

Figure 1:
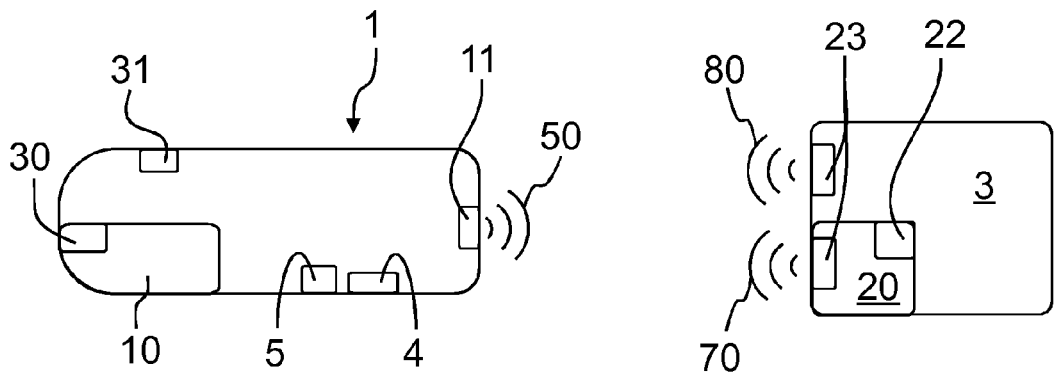
FIG. 1 schematic view of a system according to the invention for authentication of the driver in a motor vehicle with an external station, which is in signal connection with the recognition device of the motor vehicle, FIG. 2 another embodiment of the recognition device according to FIG. 1, FIG. 3 another embodiment of the checking device which is applicable in an external station according to FIG. 1, FIG. 4 another embodiment of the checking device, FIG. 5 another embodiment of a system for authentication of a driver of a motor vehicle, FIG. 6 another embodiment of the system according to the invention and FIG. 7 another alternative of the described system for authentication of the driver in the motor vehicle.
Figure 4:
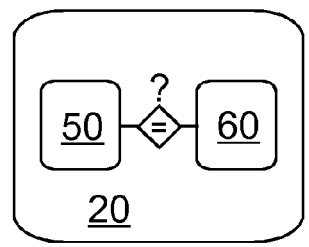

In FIG. 1 a motor vehicle 1 is schematically shown in which a not explicitly shown driver can be situated. After the driver is situated within the motor vehicle 1 a recognition of actual data 50 of the driver can occur via a recognition device 10. When the actual data 50 are recognized the transmission of the actual data 50 to a spaced apart external station 3 occurs via communication means 11 assembled within the motor vehicle 1. In this external station 3 the actual data are recognized via communication means 23. Moreover, the extended station 3 comprises a checking device 20, which compares the received actual data 50 with the target data 60 via a communication means 23, which is schematically shown in FIG. 4.

The target data 60 were memorized before, meaning before the authentication, via the memorizing device 21, wherein the memorizing device 21 recognizes data from the driver. In the present embodiment the target data 60 and the actual data 50 of the driver represent biometrical actual data 50 and biometrical target data 60.

It is for example possible that the driver stayed within the external station 3 in which the memorizing device 21 recognized the corresponding biometrical target data 30. Likewise it is possible that the memorizing, device 21 is assembled apart from the center station 3, like shown in FIG. 5. After the biometrical target the memorizing device 21 it is possible that this biometrical target data 60 are transmitted to the memorizing device 21 spaced apart from the external station 3 recognizes data 60. Within the external station 3 a checking device 20 is assembled, which conducts a corresponding examination or comparison of the actual data 50 with the target data 60. If a matching of the data exists the external station 3 sends an enabling signal 70 to the motor vehicle 1 according to FIGS. 1 and 5. The enabling signal 70, which can be received via communication means 11 of the motor vehicle 1 enables that via a defined action of the driver the ignition operation of the motor vehicle 1 is initiated. The defined action of the driver can for example be that the driver actuates the ignition switch and/or the start/stop switch 4 within the motor vehicle. It is an advantage if this conscious activation of the driver triggers the start of this previously described authentication procedure and with a positive authentication the ignition operation of the motor vehicle 1.

Figure 3:
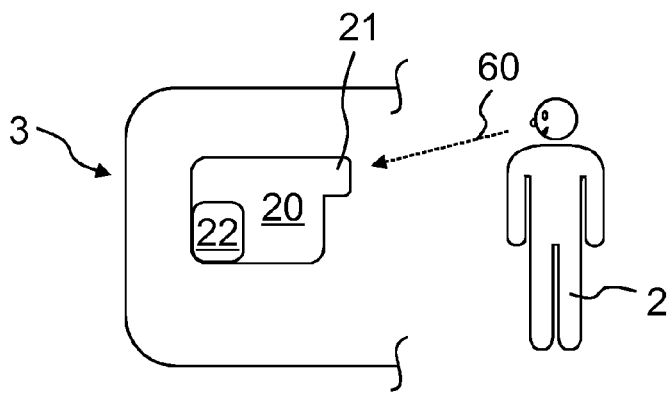
Figure 5:
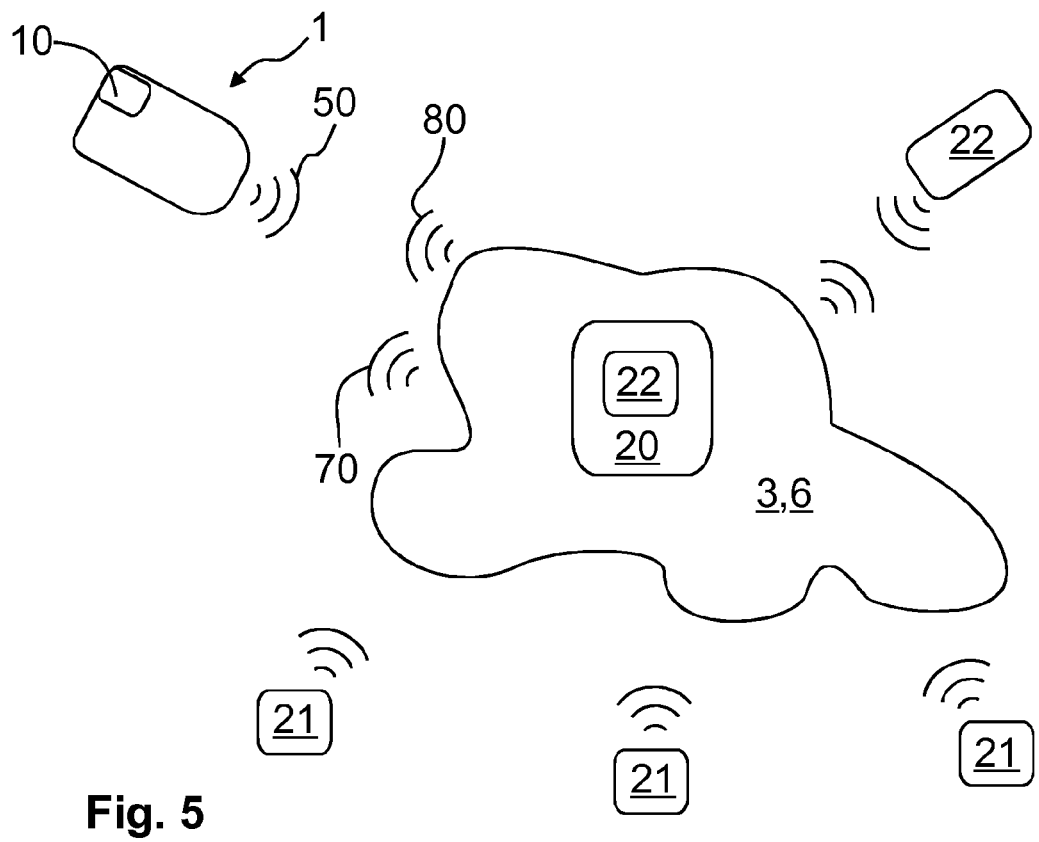

According to FIG. 1, FIG. 3 and FIG. 5 a memory 22 or a databank can be intended, which can save the biometrical target data 60. This memory/databank 22 can for example be integrated in the checking device 20. Likewise it is possible that the checking device 20 can communicate with an external databank or an external memory 22 in order to receive the target data 60 for the examination of the actual data 50. This alternative is also shown in FIG. 5.

The transmission of the actual data 50, the target data 60 and the enabling signal 17 can be encrypted. The recognition device 10 and the memorizing device 21 can for example comprise an optical or an acoustic recognition element in order to record or recognize biometrical characteristics of the driver 2.

Figure 2:
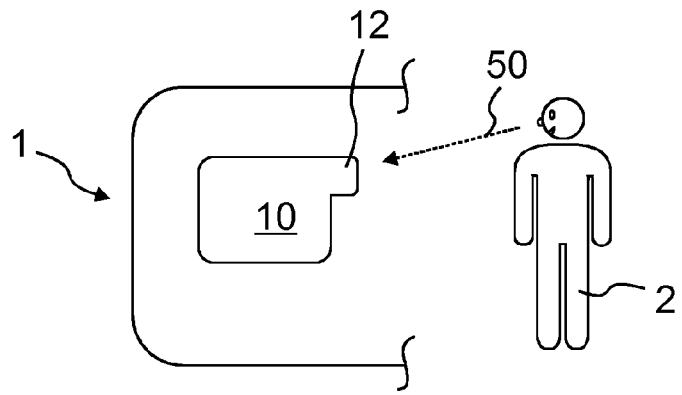

It is for example possible that a camera 12 is intended in order to determine biometrical parameter or information of the driver 2 which is schematically shown in FIG. 2.

In FIG. 2 also a memory can be intended in the recognition device 10 which is not explicitly shown, which temporarily saves the actual data 50, which are subsequently transmitted to the external station 3.

As long as no matching of the to be compared data 50, 60 occurs the motor vehicle 1 is in a safety mode according to FIG. 1 and FIG. 5 at which the ignition of the motor vehicle 1 is locked. This means that for example the ignition steering of the motor vehicle 1 is deactivated. Only by a matching of the to be compared data 50, 60 a change of the motor vehicle 1 in an ignition mode occurs so that the motor of the motor vehicle can be started.

In FIG. 1 it is shown that a steering 30 can be intended in the recognition device 10, which starting with a defined action of the driver can start the previously described authentication. After receiving the enabling signal 70 the steering 30 for example the motor steering 31 of the motor vehicle 1 can send a corresponding signal that the motor vehicle 1 can be changed from the safety mode to the ignition mode. Likewise it is possible that the motor steering 21 completely takes over the function of the steering 30, so that the steering 30 of the recognition device 10 can be assigned.

Figure 6:
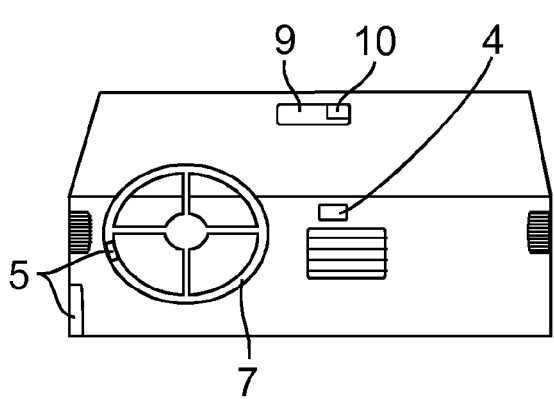

According to FIG. 1 it is shown that by an actuation of the ignition switch 4 the operation of authentication can be started. According to FIG. 6 and FIG. 7 it can be intended that for starting the authentication a second defined action of the driver 2 has to exist, in order to start an authentication of the previously described manner. According to FIGS. 1 and 6 it is for example possible that the driver 2 has to touch beneath the activation of the ignition switch 4 which can alternatively also be a start/stop switch the steering wheel 7. Within the steering wheel 7 a sensor 5 is intended which recognizes the second defined second action of the driver 2. Only when both actions of the driver are performed, the authentication process starts. The recognition device 10 can for example be integrated in the rear mirror 9, which registers the actual data 50 of the driver 2. In order that manipulations are preferably excluded, the sensor 5 can be assembled lateral to the steering wheel 7 so that the co-driver cannot actuate the sensor 5.

Figure 7:
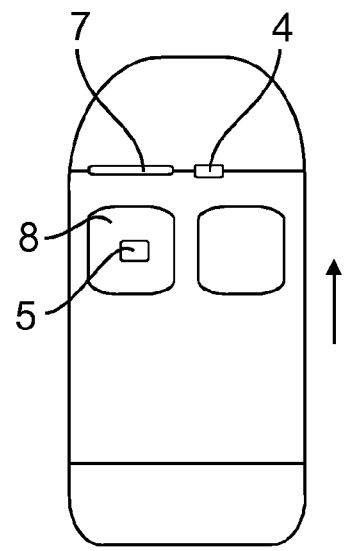

FIG. 7 shows another variation by which the sensor 5 is integrated into the driver seat 8. Only when the ignition switch 4 and the sensor 5 register the driver the authentication process starts. The actual data 50 according to FIG. 7 can be detected via a recognition device 10 like for example shown in FIG. 6, which are integrated in the rear mirror 9. Naturally, alternative technologies like already described above are also possible in order to detect biometrical actual data 50 of the driver 2.

According to FIG. 1 and FIG. 5 it is possible that the recognition device 10 within the motor vehicle 1 stays deactivated as long as the corresponding reveille 80 is transmitted from the external station T3 in the direction of the motor vehicle 1. This reveille 80 received from the motor vehicle 1 effects that the recognition device 10 can be transferred from their deactivated state to an activated state, so that the recognition device 10 can be activated via one or multiple defined actions of the driver 2 in order to receive biometrical actual data 50 of the driver 2. According to FIG. 5 it is further possible that the external station 3 is integrated within the Internet 6 so that the data 50, 60, 70, 80 within the Internet 6 or at least partially within the Internet 6 and can be transmitted via radio. The databank or the memory 22 can be located on the server coupled to the Internet 6.

The communication means 23 of the external station 3 can also be in the checking device 20 or in the recognition device 21. Herewith it is possible that the memorizing device 21 is integrated in the checking device 20, which is for example shown in FIG. 3. In FIG. 5 however the memorizing device 21 is separated from the checking device 20.

Advantageously, the authentication occurs uniquely before each ordinary ignition procedure. Likewise it can be intended that according to all figures identification according to the described embodiments is automatically performed in regular or irregular intervals during the Drive. If in a surprising manner a positive authentication is not confirmed by the checking device of the external station 3 a signal can for example be released, that informs further persons. Likewise it is possible that a corresponding signal from the external station 3 is transmitted to the motor vehicle 1 particularly to the steering 30 or the motor steering 31. It is for example possible that herewith the steering 30, 31 informs the driver 2 via an acoustic or visual signal that no positive authentication exists. Likewise the invention can also comprise that the driver 2 is forced via the motor steering 31 to stop the motor vehicle 1 or the steering 30 or the motor steering 31 provokes a shutdown of the motor vehicle motor. In the last mentioned embodiment it can be appreciated that before a shutdown of the motor vehicle motor the driver 2 is informed namely that the shutdown will shortly occur via the motor steering 31 or the steering 30 so that the driver has enough time to reduce the vehicle speed and independently park the motor vehicle and shut down the motor.

In a possible embodiment of the invention the recognition device 10 can be permanently assembled within the motor vehicle 1. Alternatively, it is also possible that the recognition device 10 is mobile within the motor vehicle 1. Herewith it can be intended that the recognition device 10 is a cell phone which can communicate with the checking device 20 via an own communication means.

In another embodiment of the invention the actual data 50 can be composed of a credit card, EC-card, a passport, identification or by a drivers license of the driver. It is particularly possible that the recognition device 10 recognizes defined areas of the identification and these data are subsequently transmitted to the checking device 20.

For example according to FIG. 1 or FIG. 2 the recognition device 10 can be performed as a cell phone, which is movably and mobile assembled within the motor vehicle 1. By a camera 12 assembled at the cell phone 10 for example biometrically the data of the user 2 can be registered. The cell phone 10 can comprise an own communication means, which corresponds to the communication means 11 from FIG. 1 in order to transmit actual data 50 to the external station 3. All embodiments of the FIGS. 1 to 7 are also applicable for a cell phone 10 as a recognition device.

REFERENCES

1 Motor Vehicle
2 Driver
3 Extended Station
4 Ignition Switch
5 Sensor
6 Internet
7 Steering Wheel
8 Seat
9 Rear Mirror
10 Recognition Device
11 Communication Means
12 Camera
20 Inspection Device
21 Memorizing device
22 Memory/Database
23 Communication Means
30 Drive
31 Motor Steering
50 Actual Data at
60 Target Data
70 Enabling signal
80 Reveille

What is claimed is:

1. Method for authenticating a driver in a motor vehicle, the method using a recognition device assembled in the motor vehicle for the recognition of actual data of the driver which are transmitted to a reviewing device during the authentication, a checking device being assembled in an external station outside the motor vehicle, wherein
   a) the checking device compares the actual data with target data, the target data having been read into the external station previous to the authentication, there being additional information stored in the external station, the additional information being time frame information, and, upon matching of the actual data with the target data and with the additional information, transmits an enabling signal from the external station to the motor vehicle, whereby an ignition procedure is enabled for the driver, and b) the recognition device is a cell phone which can communicate with the reviewing device via an own communication means.

2. Method according to claim 1, characterized in that the target data are read into the external station previous to the authentication, and into a memorizing device, which records target data of the driver outside the motor vehicle which are saved in the external station.

3. Method according to claim 2, characterized in that as long as no matching of the data exists the motor vehicle is in a safety mode, in which an ignition of the motor vehicle is blocked, wherein with a matching of the data the motor vehicle is in an ignition mode.

4. Method according to claim 1, characterized in that as long as no matching of the data exists the motor vehicle is in a safety mode, in which an ignition of the motor vehicle is blocked, wherein with a matching of the data the motor vehicle is in an ignition mode.

5. Method according to claim 1, characterized in that a steering action carried out by the driver starts the authentication, the authentication thus being based on at least one defined action of the driver.

6. Method according to claim 5, characterized in that the authentication starts during a conscious activation of an ignition switch assembled within the vehicle.

7. Method according to claim 1, characterized in that the actual data are biometrical actual data.

8. Method according to claim 1, characterized in that the recognition device recognizes biological information of the driver as actual data during the authentication wherein the actual data comprises at least one characteristic of the following biological information: body height, iris, retina, face geometry, fingerprint, line of hand structure, hand blood vessel structure, hand geometry, nail bed structure, ear form, voice, signature, pattern of movement behavior for at least one defined movement of the driver, movement of the lips.

9. Method according to claim 1, characterized in that first authentication starts not before a second defined action of the driver exists, wherein the second defined action is recognized by a vehicle related sensor.

10. Method according to claim 9, characterized in that the sensor is a seat sensor or a pedal sensor or a gear shift sensor or a sensor for recognizing a mobile identification transmitter, which is carried on by the driver.

11. Method according to claim 1, characterized in that the recognition device comprises a camera for recognizing the actual data.

12. System for authentication of a driver in a motor vehicle the system comprising a recognition device, a checking device and an external station, the recognition device being assembled within the motor vehicle for recognizing actual data of the driver, which are transmitted to said checking device during the authentication, the checking device being assembled in the external station outside the motor vehicle, wherein
   the checking device compares the actual data with target data and with additional information, the additional information including time frame information, and transmits an enabling signal from the external station to the motor vehicle with the matching of the actual data with the target data, whereby an ignition procedure of the motor vehicle is enabled for the driver; and
   the recognition device is a cell phone which can communicate with the reviewing device via an own communication means; and
   the actual data is from one member of the group consisting of a credit card, an electronic cash (EC), a passport, an identification card and a driver's license.

13. System according to claim 12, characterized in that the motor vehicle comprises communication means in order to send and/or receive actual data and the enabling signal wherein the external station comprises a communication means in order to receive and/or send actual data and the enabling signal.

14. System according to claim 13, characterized in that steering as an input action by the driver is integrated in the recognition device wherein steering as an input action can be brought into a signal connection with motor steering, the motor steering being an output action of turning wheels of the vehicles.

15. System according to claim 12, characterized in that steering, as a driver input action, is integrated in the recognition device (10) wherein steering as a driver action can be brought into a signal connection with motor steering, the motor steering being a steering output action of turning wheels of the vehicle.

16. System according to claim 12, characterized in that the recognition device is assembled within the motor vehicle in a way that only a recognition of actual data is enabled from a driver seat of the motor vehicle.

17. System according to claim 12, characterized in that the recognition device comprises a communication module for the installation of a communication connection with a mobile communication network, wherein the recognition device is mobile, and is removable from the motor vehicle.

18. System according to claim 12, characterized in that the recognition device is assembled within the motor vehicle in a way that only a recognition of actual data is enabled from a driver seat of the motor vehicle.

19. Method for authenticating a driver in a motor vehicle, the method using a recognition device assembled in the motor vehicle for the recognition of actual data of the driver which are transmitted to a reviewing device during the authentication which is assembled in an external station outside the motor vehicle, wherein a checking device compares the actual data with target data and with additional information, and with matching of the actual data with target data transmits an enabling signal from the external station to the motor vehicle, whereby an ignition procedure is enabled for the driver, the additional information comprising time frame information; and the actual data comprises one member belonging to the driver of the group consisting of a credit card, an electronic cash (EC) card, a passport, an identification card, and a driver's license.

20. System for authentication of a driver in a motor vehicle the system comprising a recognition device, a checking device and an external station, the recognition device being assembled within the motor vehicle for recognizing actual data of the driver, which are transmitted to the checking device during the authentication, the checking device being assembled in the external station outside the motor vehicle, wherein the checking device compares the actual data with target data and with additional information comprising time frame information, and transmits an enabling signal from the external station to the motor vehicle with the matching of the actual data with the target data, whereby an ignition procedure of the motor vehicle is enabled for the driver; and the actual data comprises one member belonging to the driver of the group consisting of a credit card, an electronic cash (EC) card, a passport, an identification card, and a driver's license.

* * * * *